Feb. 26, 1929.          K. SCHMIDT          1,703,782
TREATING GREEN FOOD
Filed May 2, 1928
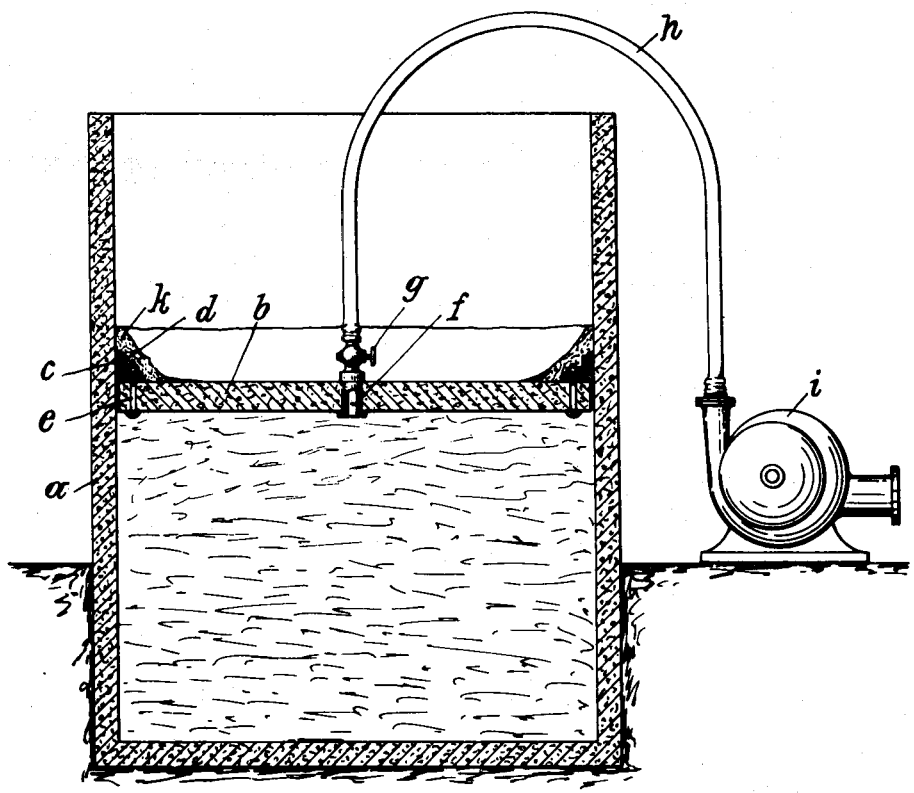
Inventor:
Karl Schmidt
by
Atty.

Patented Feb. 26, 1929.

1,703,782

UNITED STATES PATENT OFFICE.

KARL SCHMIDT, OF MUNICH, GERMANY.

TREATING GREEN FOOD.

Application filed May 2, 1928, Serial No. 274,543, and in Germany March 23, 1923.

My invention refers to green food for cattle, sheep etc. and more especially to means whereby such green food can be preserved and its contents of albuminous matter protected against losses by decomposition.

In recent times investigators in several countries, including the United States, have tried to devise means for preserving green food (including grass etc.) in silos with a view to preserving its high contents of albuminous matter. For experience has shown that fresh food stuffs containing albumen have a very favourable influence on the health conditions of the animals and more especially on the quantity and percentage of fatty matter of the milk produced by them. Hitherto the preservation of green food has been effected in several ways. One of the most widely known methods is the method of fermentation at elevated temperature, according to which the plant cells are killed by rapid heating to 50° C. In order to attain this temperature, the material is heated either by respiration or by subjecting same to the action of electric current or by the introduction of hot gases. Heating by intramolecular respiration results in a partial destruction of the nutritive value. Heating by means of electric current or hot gases entails considerable expense for the cost of electrical energy and of heating material, respectively. For all these purposes the green food must be stored in the silos in dried or rather in withered condition, for moist material will greatly endanger the storage in the silos. Moreover the food must in most cases be chopped before being stored and must then be compressed by stamping and pressing. Both these processes further require very long periods of storage in the silo.

Another method which differs fundamentally from those above described, is carried through by fermentation in the cold, which requires very strong pressure in order to remove the air from the green food in the silo inasmuch as the oxygen of the air favours the growth of the bacteria, which are the principal cause of the decomposition of the nutritive matter and of the formation of obnoxious acids, such as butyric and acetic acid.

It has also been suggested to add to the green food cultures of lactic bacteria in order to facilitate and expedite the fermentation in the cold. However, such an addition is objectionable inasmuch as the farmer would be required to increase the parent cultures by circumstantial processes in order to have at his disposition sufficient quantities of inoculation lymph. The mechanical presses hitherto used do not allow obtaining pressures above 500 kgs. per square meter, which is not sufficient to remove the air quickly enough. In consequence thereof pressure must be applied during several weeks, whereby higher temperatures and undesirable fermentation, resulting in the decomposition of the nutritive matter, will occur in the silo.

All these difficulties and deficiencies, more especially the losses in substance and nutritive matter, can be avoided according to the present invention, if the green food, either in chopped or non-chopped condition, is placed in a silo or other suitable container adapted to be airtightly closed, a movable cover, for instance a metal cover or a cover made of suitably treated wood, being placed on top of the green food in the container, and means being provided for ensuring an air-tight fit between the circumferential edge of the cover and the wall of the silo. The air and other gases are then evacuated from the container and from the material stored by suction. While this is being effected, the atmospheric pressure will act on the cover and will compress the material stored in the silo, while at the same time the moisture in excess contained in the material is removed together with the air and other gases.

The degree of evacuation to be used in each individual case depends upon the degree of air-tight packing between the cover and the wall of the silo. I have found that favourable results can be obtained if the circumferential portion of the cover is packed by means of a ring made of clay or loam which is forced onto the marginal portion of the cover and against the wall of the silo. With the aid of a powerful air suction pump a low vacuum down to 30 centimeters mercury column can be attained very quickly even if large quantities of green food (above 5000 kgs.) are treated. A vacuum as specified above suffices to strongly compress the material, a pressure of about 4000 kgs. per square meter being obtained, and the material thus treated will be subjected to fermentation in the cold without any further treatment. If air suction pumps of higher efficiency are used, a higher vacuum will be obtainable.

In the drawings affixed to this specification and forming part thereof means embodying my invention are illustrated diagrammatically in vertical section by way of example.

In the drawings, $a$ is a cylindrical container (silo) which may be made of metal, concrete, brickwork, wood or some other suitable material rendered impervious to air and other gases by impregnation, lining or the like. $b$ is the cover made of metal, wood, armoured concrete or some other suitable material, this cover being shaped to fit in the silo, so as to be axially movable therein. $c$ is a packing ring made of felt or some other suitable packing material, and $d$ is a metal ring of angular cross section fixed to the cover by means of screw bolts $e$ and serving to hold the felt ring $c$ down on the cover and to press same against the wall of the silo $a$. $f$ is a tubular connection provided with a cock $g$ and fitted in a central hole of the cover $b$. $h$ is a pressure-proof flexible tubing or hose, mounted with one end on the connecting piece $f$, its outer end being connected to a rotary suction pump $i$, the construction of which need not be described as any powerful suction pump may be used for this purpose.

$k$ is an annular layer of loam, clay or some other plastic material arranged on top of the rings $c$, $d$ and forced by pressure against the top of the marginal portion of cover $b$ and against the inner wall of the container $a$ so as to closely apply itself against these surfaces. This annulus $k$ will efficiently seal any gap left between the cover $b$ and container $a$ and will descend with the cover $b$ or may be arranged thereon only after this cover has attained its lowermost position.

In the operation of this arrangement the cover $b$ is first removed from the container and the material to be treated is filled in, whereupon the cover is placed in the container on top of the material and is forced down by pressure so far that the felt ring $c$ applies itself against the inner wall of the container. The suction pump is now set operating and by sucking the air and moisture from the interior of the container and from the material stored therein will create a vacuum in the container below the cover, whereby this latter will be forced down into the container under the action of the atmospheric pressure, compressing the material in the container.

As a result of a very great number of tests I have found that if a container or silo having a diameter of 4 meters and being 5,5 meters high, was filled with green food up to the top and the cover was placed in position and the suction pump started, the material was compressed after the lapse of one hour substantially to the extent of being ready for cold fermentation, the distance between the cover and the top edge of the silo after one hour's pumping being about 2,5 meters.

In the manner aforesaid grass, clover, lucern, maize and turnip tops have been treated with the greatest success.

I have further found that I can improve the fermentation process conducted in accordance with this invention by introducing into the evacuated container agents having a bactericidal effect. I have found it particularly useful to introduce bactericidal gases or vapours such as carbon disulfide. I may for instance introduce across the tubular connection $f$ and cock $g$ a pointed pipe perforated near the point, forcing such pipe into the material to be treated, this pipe being connected with a receptacle filled with carbon disulfide. The vacuum in the container $a$ will cause carbon disulfide vapours to be formed and to enter the container, distributing in the green food contained therein. I have found that small quantities of carbon disulfide amounting to about 15 kgs. per 50,000 kgs. green food suffice fully to attain the desired result. By experiments carried out with guinea-pigs and cows it has been shown that the carbon disulfide treatment is entirely innoxious, working no harm whatever to the animals fed with such food.

Sheep weighing about 45 kgs. live weight, on being fed during four weeks with green food treated in accordance with this invention, showed an increase in weight up to 5 kgs. (11 per cent), each animal being fed daily with 4 kgs. lucern and 1 kg. straw.

The chemical analysis of lucern treated in accordance with this invention gave the following results:

|  | Crude protein | Pure albumen | Extractive matter free from nitrogen |
|---|---|---|---|
| Raw product | 20.6% | 11.8% | 47.8% |
| Treated product | 20.6% | 8.4% | 30.1% |

The acid analysis showed the following results:

| Lactic acid | Butyric acid | Free acetic acid | Combined acetic acid | Ammonia nitrogen |
|---|---|---|---|---|
| 0.94% | ---------- | 0.56% | 0.27% | 0.058% |

The smell of the treated food was that of well pickled cucumbers.

The invention offers the following advantages, as compared with the methods hitherto used:

While the electric treatment of 50,000 kgs. green food requires 50–90 hours, the vacuum treatment according to this invention requires only 8 hours. A great saving of labour and electrical energy is obtained, the electrical treatment requiring from 2.6 to 6 kilowatt hours, the vacuum treatment only 0.2 kilowatt hours per 100 kgs. Time and labour are further saved for the chopping, most of the green food being operated on in non-chopped condition. No decomposition of albuminous matter and more especially of vitamines by self-heating is experienced. In the hot fermentation process, if a temperature of 50° C. shall not be overstepped, the fermentation process must be kept under careful control inasmuch as the heating tendency of the different kinds of green food and even of the same kinds will differ greatly according to ripeness and moisture. In the practical operation of the hot fermentation process the temperature frequently rises above 50° C., whereby valuable nutritive matter is decomposed and the digestibility of the food is greatly reduced. Owing to the very high compression which may attain almost 10,000 kgs. per square meter, as compared with only 500 kgs., when employing mechanical presses, the air is removed very quickly and the food is compressed very strongly, thereby producing a reduction of temperature which does not allow any undesirable fermentation to arise and prevents the resouring when the compressed material is withdrawn from the silo. The air-tightly closing cover prevents air from entering the silo, so that the material can be consumed up to the topmost layers. In the fermentation process the analysis of the gas contained in the compressed material shows already after a short treatment great quantities (80–90 per cent) of carbonic acid, however, the percentage is subject to material fluctuations during the first two weeks and the same is true of the percentage of oxygen, which does not, however, attain more than 15 per cent. However, this increase of energy is known to be accompanied by the decomposition of nutritive matter, more especially the easily digestible albumen and carbohydrates, and it is therefore important that this decomposition be shortened as much as possible. This is effected by treating the material in accordance with the present invention, which also provides for automatic removal of rain and dew moisture and of the plant juices in excess, so that the farmer is independent of the weather.

Various changes may be made in the details disclosed in the foregoing specification without departing from the invention or sacrificing the advantages thereof.

I claim:—

1. The process of preserving green food comprising removing from the food part of the air and other gases and moisture by evacuation, at the same time acting on said food with pressure and introducing a bactericidal gas.

2. The process of preserving green food comprising removing from the food part of the air and other gases and moisture by evacuation, at the same time acting on said food with pressure and introducing carbon disulfide vapour.

3. The process of preserving green food comprising simultaneously subjecting the food to compression and evacuation of a portion of the air, gases and moisture contained therein.

In testimony whereof I affix my signature.

KARL SCHMIDT.